US008874959B2

(12) United States Patent
Hirata

(10) Patent No.: US 8,874,959 B2
(45) Date of Patent: Oct. 28, 2014

(54) INFORMATION PROCESSING APPARATUS, IMAGE FORMING APPARATUS, AND INFORMATION PROCESSING PROGRAM

(75) Inventor: Satoshi Hirata, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 149 days.

(21) Appl. No.: 13/047,217

(22) Filed: Mar. 14, 2011

(65) Prior Publication Data

US 2011/0231712 A1    Sep. 22, 2011

(30) Foreign Application Priority Data

Mar. 18, 2010 (JP) .................................. 2010-063273

(51) Int. Cl.
*G06F 11/00* (2006.01)
*G06F 11/07* (2006.01)
(52) U.S. Cl.
CPC ........ *G06F 11/0781* (2013.01); *G06F 11/0778* (2013.01); *G06F 11/0757* (2013.01)
USPC .......................................................... 714/10
(58) Field of Classification Search
USPC ..................................................... 714/42, 10
See application file for complete search history.

(56) References Cited

U.S. PATENT DOCUMENTS

| | | | | |
|---|---|---|---|---|
| 5,394,407 | A * | 2/1995 | Coddington | 714/752 |
| 5,633,864 | A * | 5/1997 | Tibi | 370/392 |
| 6,101,422 | A * | 8/2000 | Furlong | 700/96 |
| 6,311,296 | B1 | 10/2001 | Congdon | |
| 6,438,666 | B2 * | 8/2002 | Cassagnol et al. | 711/163 |
| 7,377,609 | B2 * | 5/2008 | Walmsley et al. | 347/14 |
| 7,406,632 | B2 * | 7/2008 | Sealey et al. | 714/48 |
| 7,681,106 | B2 * | 3/2010 | Jarrar et al. | 714/763 |
| 2001/0044886 | A1 * | 11/2001 | Cassagnol et al. | 711/163 |
| 2003/0037172 | A1 * | 2/2003 | Lacombe et al. | 709/310 |
| 2004/0080773 | A1 | 4/2004 | Jamison et al. | |
| 2005/0114732 | A1 * | 5/2005 | Janin et al. | 714/30 |
| 2005/0240822 | A1 | 10/2005 | Miyamoto | |
| 2006/0048004 | A1 | 3/2006 | Kawashima | |
| 2007/0234181 | A1 * | 10/2007 | Jarrar et al. | 714/763 |
| 2008/0168242 | A1 | 7/2008 | Eberbach et al. | |
| 2008/0276132 | A1 * | 11/2008 | Majewski et al. | 714/55 |

FOREIGN PATENT DOCUMENTS

| | | |
|---|---|---|
| JP | 63-262742 A | 10/1988 |
| JP | 4-219847 A | 8/1992 |
| JP | 9-6651 A | 1/1997 |
| JP | 2004-185318 | 7/2004 |
| JP | 2006-11969 | 1/2006 |

(Continued)

OTHER PUBLICATIONS

Extended European Search Report issued Jul. 20, 2011, in Patent Application No. 11158752.3.

*Primary Examiner* — Amine Riad
(74) *Attorney, Agent, or Firm* — Oblon, Spivak, McClelland, Maier & Neustadt, L.L.P.

(57) ABSTRACT

A CPU I/F decodes a signal transmitted from a CPU to a target location, and transmits the decoded signal to a mediating module mediating with the target location and to an access log recording unit. The access log recording unit generates an access log using the signal received from the CPU I/F, and stores the access log in an internal RAM. A DMA stores the access log stored in the internal RAM in a nonvolatile RAM when a system controller detects any occurrence of an error in the CPU.

9 Claims, 7 Drawing Sheets

(56) References Cited

FOREIGN PATENT DOCUMENTS

| | | |
|---|---|---|
| JP | 2007-199845 A | 8/2007 |
| JP | 2008-176477 A | 7/2008 |
| JP | 2008-287319 | 11/2008 |

\* cited by examiner

INFORMATION PROCESSING APPARATUS, IMAGE FORMING APPARATUS, AND INFORMATION PROCESSING PROGRAM

CROSS-REFERENCE TO RELATED APPLICATIONS

The present application claims priority to and incorporates by reference the entire contents of Japanese Patent Application No. 2010-063273 filed in Japan on Mar. 18, 2010.

BACKGROUND OF THE INVENTION

1. Field of the Invention

The present invention relates to an information processing apparatus, an image forming apparatus, and an information processing program.

2. Description of the Related Art

Conventionally, some information processing apparatuses have a central processing unit (CPU) interface (I/F) that mediates communications in a CPU. Some of such information processing apparatuses have capabilities of analyzing, when an error occurs, contents accessed by the CPU, and finding the location causing the error. For example, by a known method, a measuring instrument is connected to the CPU I/F to observe the CPU I/F, and when an error occurs, a result of the observation is used in analyzing contents accessed by the CPU to find the location causing the error. However, by this method, finding the location of the cause of the error using the observation result has been an extremely difficult task. Furthermore, in an information processing apparatus with a built-in CPU, it has been difficult to connect a measuring instrument to the CPU I/F, further making it difficult to analyze the contents accessed by the CPU.

In some recently developed technologies, such as those disclosed in Japanese Patent Application Laid-open No. 2006-011969, Japanese Patent Application Laid-open No. 2008-287319, and Japanese Patent Application Laid-open No. 2004-185318, an access analyzing circuit for analyzing the contents accessed by the CPU is incorporated near the CPU I/F, the result of the analysis of the access analyzing circuit (analysis result) is stored in a random access memory (RAM) as a log, and the log thus stored in the RAM is output, instead of connecting a measuring instrument to the CPU I/F. More specifically, such an information processing apparatus includes a built-in CPU in or an external CPU, an external RAM, a read-only memory (ROM), an input/output (IO) device, and a serial communication interface, and also includes a decoding circuit that analyzes which location has been accessed by the CPU based on an address, a circuit for analyzing the contents accessed by the CPU, and a log receiving and transmitting direct memory access (DMA) that outputs the result of the analysis as a log.

In these conventional technologies, the result of the analysis is obtained in response to a command issued by the CPU, and stored as a log. Therefore, the log can be stored as long as the CPU is operating normally. However, once an error occurs in the CPU and the CPU becomes incapable of operating normally, the log might not be stored even if some serious error relating to the error occurred immediately before the occurrence of such an error. Moreover, a watchdog timer, for example, may be used to reset the CPU when a certain time period has elapsed since the error occurred in the CPU so that the information processing apparatus is recovered. However, when the log is analyzed later in time, such an analysis may take a long time because the operational timing at which the error occurred cannot be identified.

The present invention is made in consideration of the above, and an object of the present invention is to provide an information processing apparatus, an image forming apparatus, and an information processing program that can store contents accessed by a CPU during the period from when the normal operation of the CPU is confirmed until immediately after occurrence of an error in the occasion of any occurrence of an error in the CPU.

SUMMARY OF THE INVENTION

It is an object of the present invention to at least partially solve the problems in the conventional technology.

According to one aspect of the present invention, an information processing apparatus includes a mediating unit that accepts a signal transmitted from a central processing unit (CPU) to a target location that is a module or a device connected to the information processing apparatus via a mediating module, decodes the signal, and transmits the signal thus decoded to the mediating module mediating with the target location and a log storing control unit; the log storing control unit that generates an access log indicating the target location and a content of an access made to the target location using the signal received from the mediating unit, and stores the access log in a first storage unit; a detecting unit that detects occurrence of an error in the CPU; and a memory control unit that stores the access log stored in the first storage unit in a second storage unit when the occurrence of an error is detected.

According to another aspect of the present invention, a computer program product including a non-transitory computer-usable medium having information processing program that causes a computer used in an information processing apparatus to function as a setting unit that specifies conditions related to storing of an access log, wherein the information processing apparatus includes a mediating unit that accepts a signal transmitted from a central processing unit (CPU) to a target location that is a module or a device connected to the information processing apparatus via a mediating module, decodes the signal, and transmits the signal thus decoded to the mediating module mediating with the target location and a log storing control unit; the log storing control unit that generates an access log indicating the target location and a content of an access made to the target location using the signal received from the mediating unit, and stores the access log in a first storage unit; a detecting unit that detects occurrence of an error in the CPU; and a memory control unit that stores the access log stored in the first storage unit in a second storage unit when the occurrence of an error is detected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the information processing apparatus, the image forming apparatus, and the information processing program according to the present invention are explained below in greater detail with reference to the accompanying drawings.

First Embodiment

Figure 1:
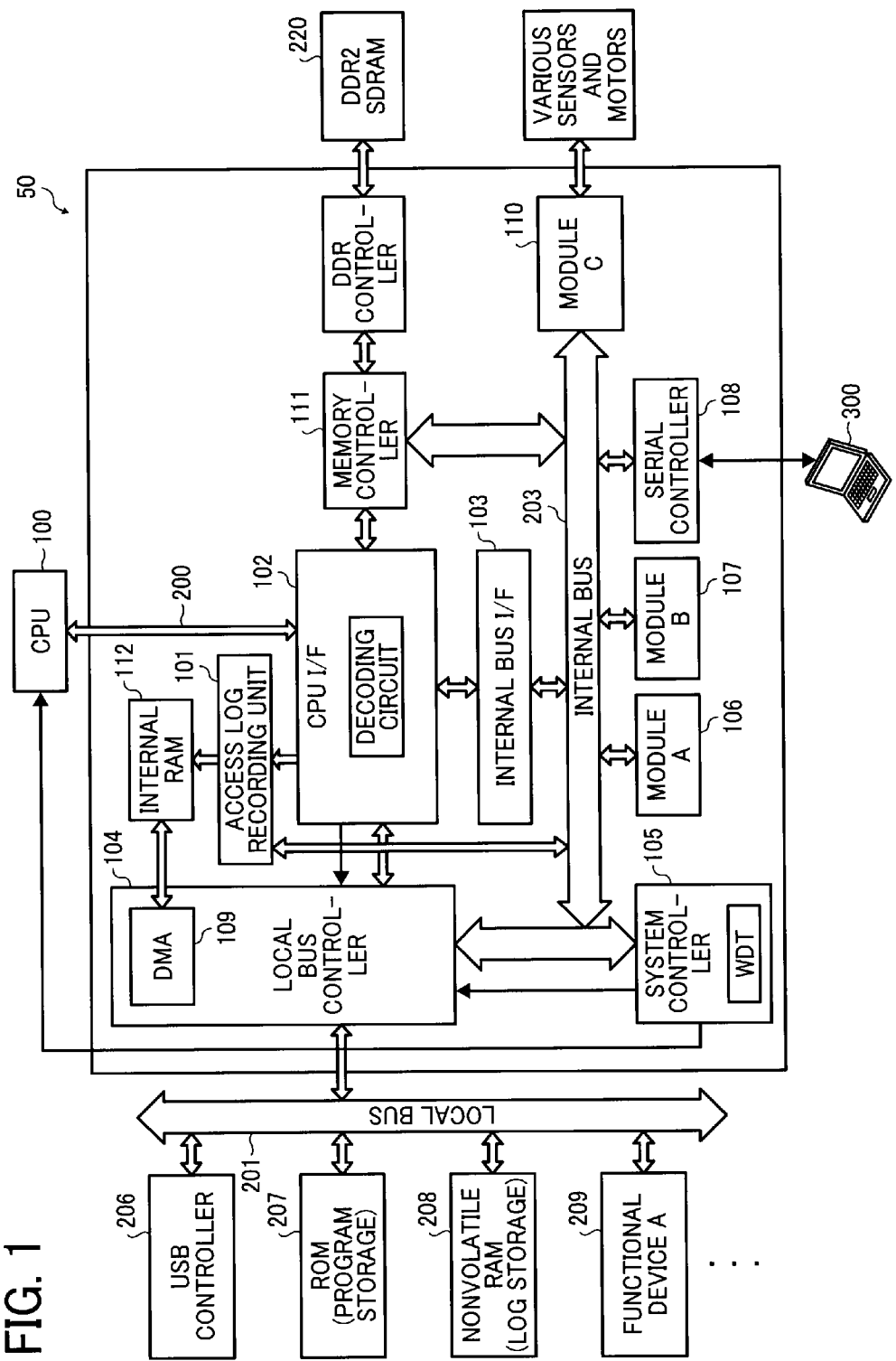
FIG. 1 is a schematic view illustrating an exemplary hardware configuration of an information processing apparatus 50 according to a first embodiment of the present invention.

A hardware configuration of an information processing apparatus will now be explained with reference to FIG. 1. An information processing apparatus 50 according to a first embodiment of the present invention includes a central processing unit (CPU) 100, an access log recording unit 101, a CPU interface (I/F) 102, an internal bus I/F 103, a local bus controller 104, a system controller 105, a module A 106, a module B 107, a serial controller 108, a module C 110, a memory controller 111, an internal random access memory (RAM) 112, a double data rate 2 synchronous dynamic random access memory (DDR2 SDRAM) 220, a universal serial bus (USB) controller 206, a read-only memory (ROM) 207, a nonvolatile RAM 208, and a functional device A 209. The CPU 100 and the CPU I/F 102 are connected via a CPU bus 200. The CPU I/F 102, the access log recording unit 101, the internal bus I/F 103, the local bus controller 104, and the memory controller 111 are connected via a bus (not illustrated). These modules including the internal bus I/F 103, the system controller 105, the module A 106, the module B 107, the serial controller 108, and the module C 110 are connected via an internal bus 203. The devices including the USB controller 206, the ROM 207, the nonvolatile RAM 208, the functional device A 209, and the local bus controller 104 are connected via a local bus 201.

The CPU 100 executes various programs stored in the ROM 207 to control the entire information processing apparatus 50 and to realize various functions. When the CPU 100 accesses any of the modules or the devices connected to the information processing apparatus 50, the CPU 100 transmits a signal to the target module or the target device via the CPU bus 200 and the CPU I/F 102. The system controller 105 includes a watchdog timer (WDT), and monitors if the CPU 100 is operating normally and detects any occurrence of an error in the CPU 100. The system controller 105 is an example of a detecting unit. Methods of monitoring and detection will be explained later. The ROM 207 stores therein various programs executed by the CPU 100, and controlling data used in controlling the CPU bus 200 upon resetting the CPU 100. The internal RAM 112 temporarily stores therein various programs and various types of data. More specifically, for example, the internal RAM 112 temporarily stores therein an access log indicating a target location accessed by the CPU 100 and a content of such an access made to the target location. Details of the access log will be explained later. The nonvolatile RAM 208 stores therein various types of data.

Each of the module A 106, the module B 107, and the module C 110 realizes a predetermined function under the control of the CPU 100. The serial controller 108 controls communications with an external apparatus 300. The functional device A 209 realizes a predetermined function under the control of the CPU 100. The USB controller 206 is an interface based on the USB Specifications. The DDR2 SDRAM 220 stores therein various programs and various types of data. The internal bus I/F 103 is a mediating module that controls communications with each of the modules connected via the internal bus 203, and controls registers for each of these modules. The local bus controller 104 is a mediating module that controls accesses to each of the devices connected via the local bus 201. The local bus controller 104 includes a direct memory access (DMA) 109. The DMA 109 is a memory controller that can access the internal RAM 112 that is an internal memory and the nonvolatile RAM 208 that is an external memory without any mediation of the CPU 100, and transmits data stored in the internal RAM 112 to the nonvolatile RAM 208 and transmits data stored in the nonvolatile RAM 208 to the internal RAM 112. The DMA 109 is an example of a memory control unit. The memory controller 111 is a mediating module that controls accesses to the DDR2 SDRAM 220 connected via a double-data-rate (DDR) controller.

The CPU I/F 102 includes a decoding circuit, and controls communications with the CPU 100 connected via the CPU bus 200 and communications with a module or a device connected to the information processing apparatus 50 via a corresponding mediating module. More specifically, for example, the CPU I/F 102 uses the decoding circuit to decode a signal transmitted from the CPU 100 to a target location, and transmits the decoded signal to the module that mediates accesses to the target location, and also to the access log recording unit 101. The CPU I/F 102 is an example of a mediating unit. Different formats are used for signals exchanged between the CPU 100 and the CPU I/F 102 depending on the specifications of the CPU 100. The access log recording unit 101 stores the access log in the internal RAM 112 based on the signal received from the CPU I/F 102. The access log recording unit 101 is an example of a log storing control unit.

Figure 2:
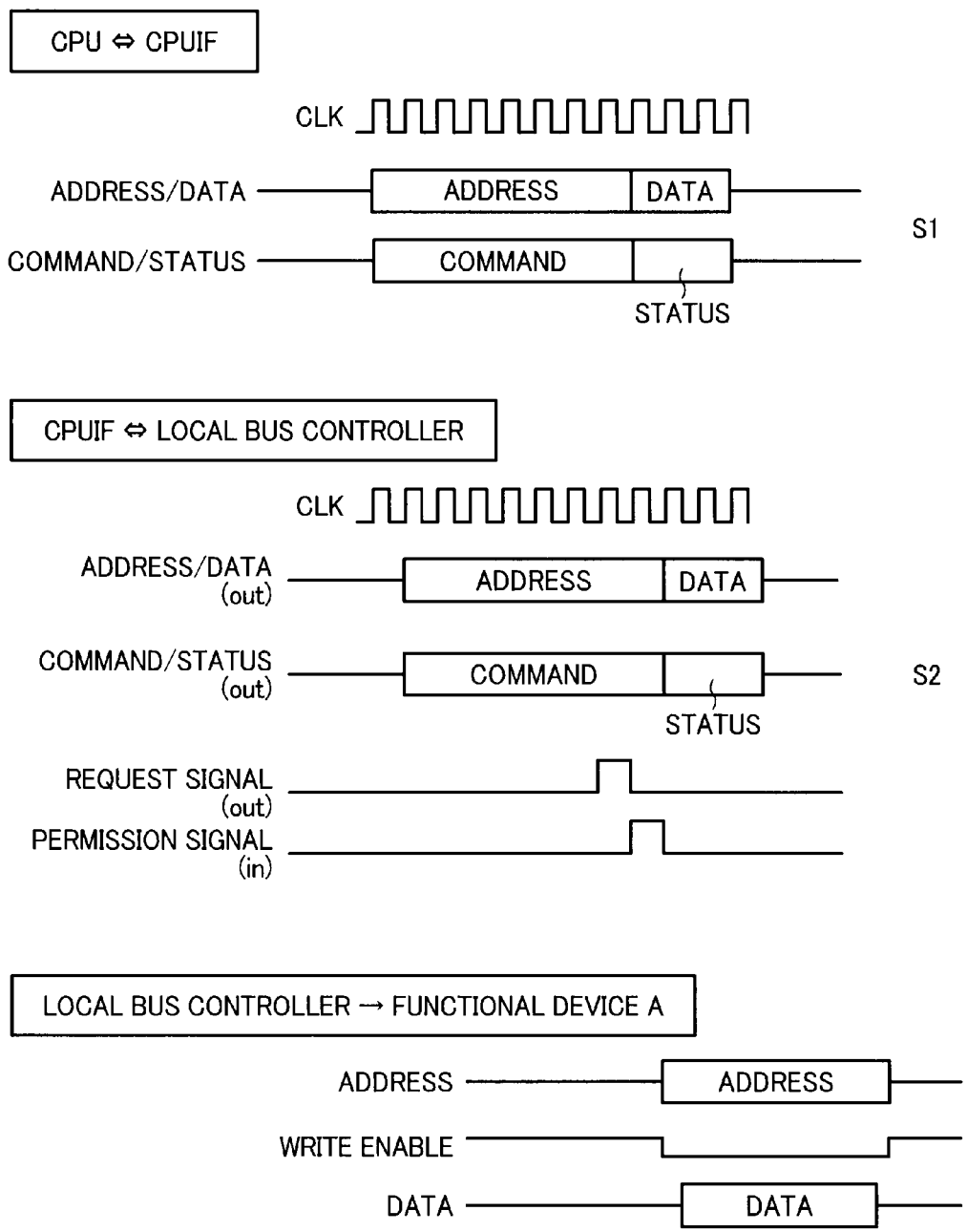
FIG. 2 is a schematic view illustrating an exemplary exchange of signals performed when a CPU 100 transmits signals to a target location via a CPU I/F 102.

In the configuration described above, an exchange of signals performed when the CPU 100 communicates with any of the modules or the devices connected to the internal bus I/F 103, the local bus controller 104, or the memory controller 111 via the CPU I/F 102 will now be explained with reference to FIG. 2. In the example explained in the embodiments, the information processing apparatus 50 functions as a master, and the CPU 100 functions as a slave. In the example illustrated in FIG. 2, the CPU 100 requests writing of data. The CPU 100 transmits an address signal indicating the address of one of the module A 106, the module B 107, the serial controller 108, the module C 110, the USB controller 206, the ROM 207, the nonvolatile RAM 208, the functional device A 209, and the DDR2 SDRAM 220 as a target location and data to be written, and a command status signal indicating a command requesting the address for writing of the data and a status. Upon receiving the address signal and the command status signal via the CPU bus 200, the CPU I/F 102 decodes the signals, and determines which one of the modules, namely the internal bus I/F 103, the local bus controller 104, or the memory controller 111 each of which is connected to the CPU I/F 102, is the mediating module performing mediation with the target location.

Figure 3:
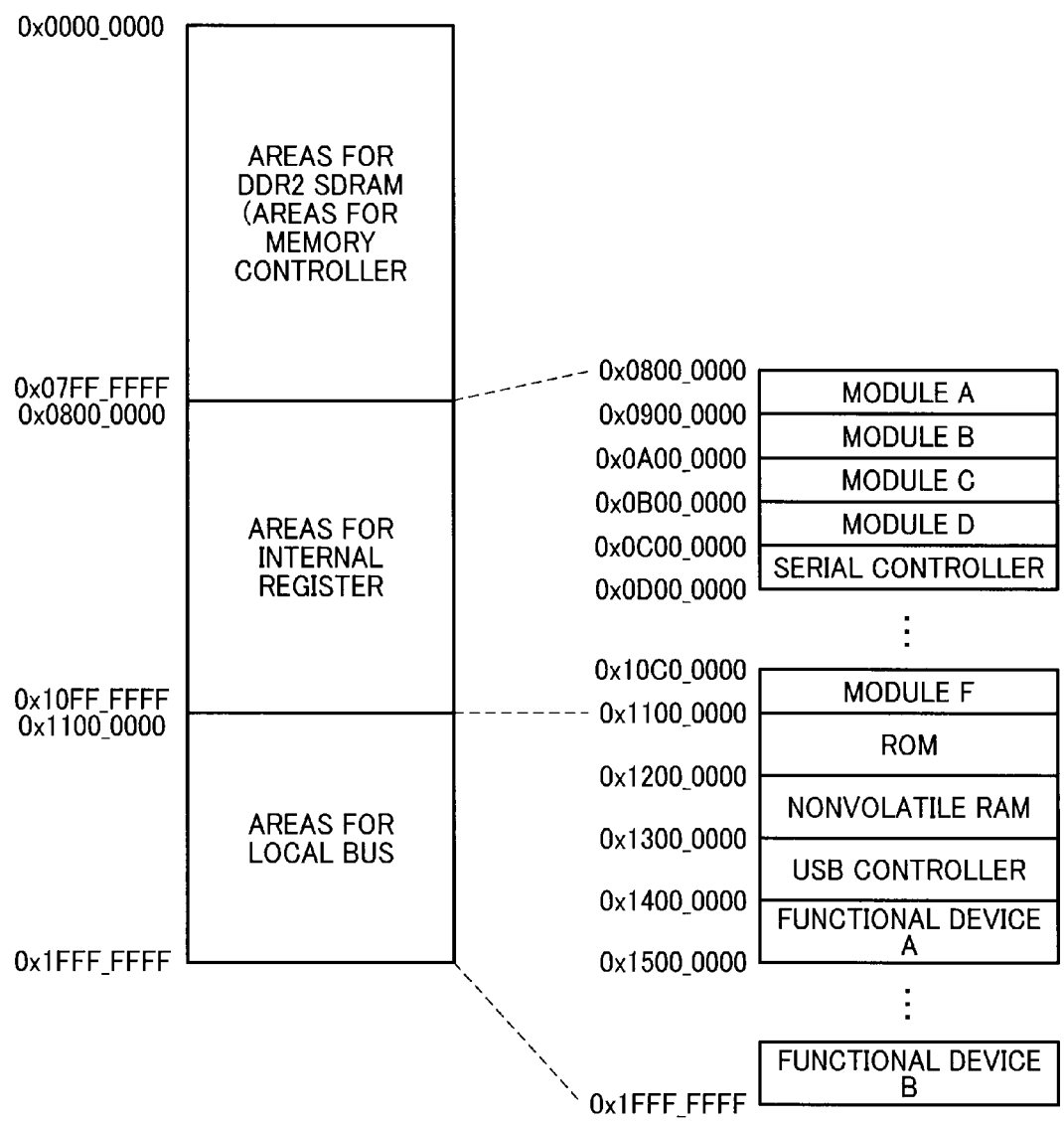
FIG. 3 is a schematic view illustrating a memory map indicating addresses assigned to respective mediating modules.

FIG. 3 is a schematic view illustrating an exemplary address map indicating the addresses assigned to these mediating modules. More specifically, when the address indicated in the address signal is within the range from "0000_0000" to "0x07FF_FFFF", as illustrated in FIG. 3, the CPU I/F 102 determines that the mediating module mediating with the target location is the memory controller 111. When the address is within the range from "0x0800_0000" to "0x10FF_FFFF", the CPU I/F 102 determines that the mediating module mediating with the target location is the internal bus 203. When the address is within the range from "0x1100_0000" to "0x1FFF_FFFF", the CPU I/F 102 determines that the mediating module mediating with the target location is the local bus controller 104.

To check the utilization status of the mediating module that is determined to mediate with the target location (hereinafter, referred to as a "target location mediating module"), the CPU I/F 102 transmits a request signal to the target location mediating module. Upon receiving the request signal while the target location mediating module itself is in an available status, the target location mediating module transmits a permission signal to the CPU I/F 102. Upon receiving the permission signal from the target location mediating module, the CPU I/F 102 decodes the address signal and the command status signal, and transmits the decoded signals to the target location mediating module. Upon receiving the decoded address signal and command status signal, the target location mediating module further decodes the signals, and determines which one of the modules or the devices connected to the target location mediating module is the target location. To determine the target location, the target location mediating module uses the memory map, an example of which is illustrated in FIG. 3, in the same manner as the CPU I/F 102. The target location mediating module generates and transmits to the module or the device that is determined to be the target location an address signal indicating the address, a data signal indicating the data, a chip selecting signal, and a write enable signal to request the module or the device to write the data. As a result, the data is written to the specified address. In the example illustrated in FIG. 2, the local bus controller 104 is the target location mediating module, and the target location is the functional device A 209, and the signals are exchanged in the sequence of S1 to S3. Data is read from a specified address in approximately the same manner. Therefore, an explanation thereof is omitted herein. In the case of reading, however, the CPU 100 transmits an address signal indicating the address of a target location, and a command status signal indicating a command for requesting reading of data from the address and the status, and the data read from the target location is transmitted to the CPU 100.

Figure 4:
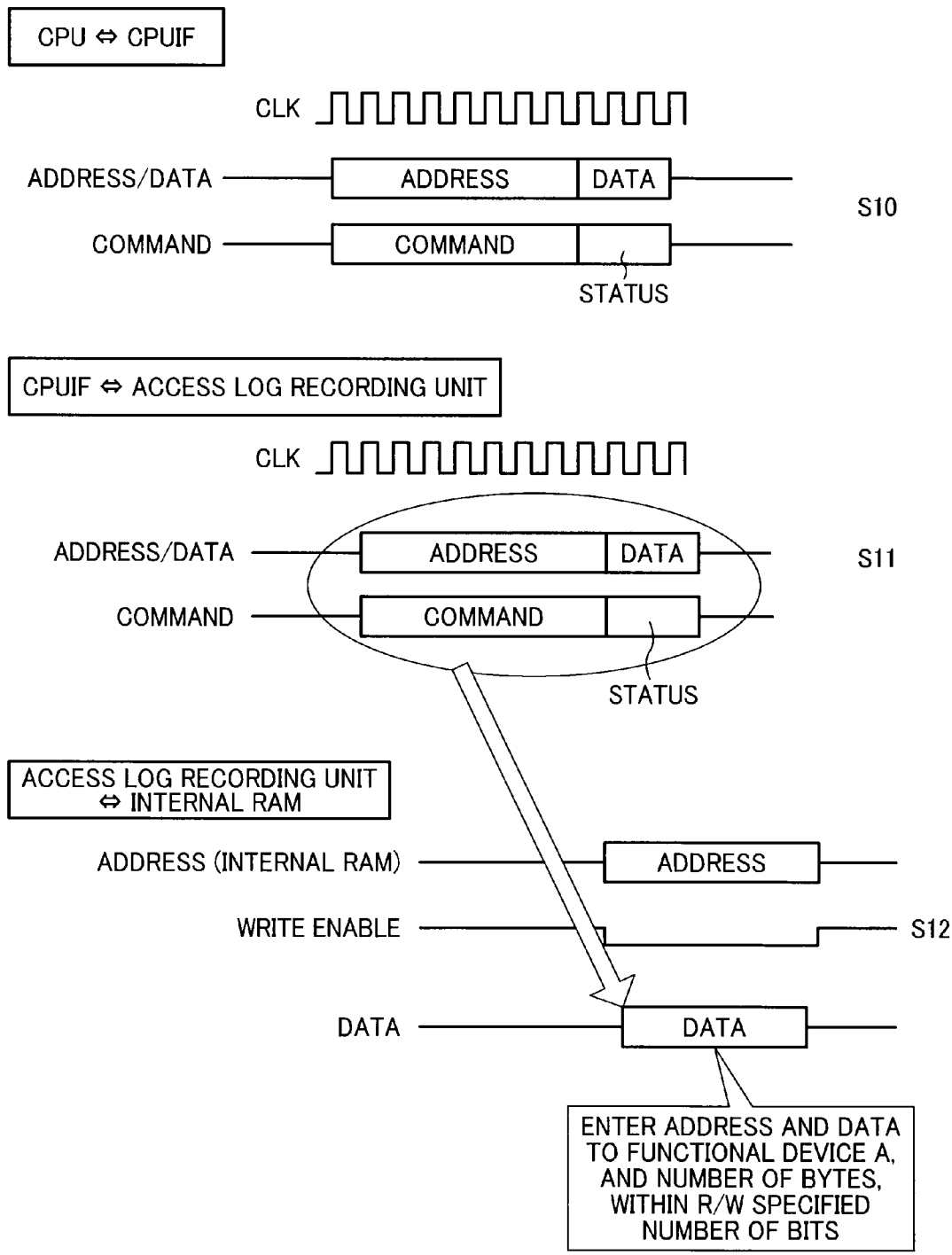
FIG. 4 is a schematic view illustrating an exemplary exchange of signals performed to store an access log in an internal RAM 112.

An exchange of signals performed upon storing the access log in the internal RAM 112 in response to the signals transmitted by the CPU 100 will now be explained with reference to FIG. 4. When the CPU I/F 102 receives the address signal and the command status signal via the CPU bus 200, the CPU I/F 102 decodes the signals, and transmits the decoded signals to the access log recording unit 101 as well as to the target location mediating module. When the access log recording unit 101 receives the address signal and the command status signal from the CPU 100 via the CPU I/F 102, the access log recording unit 101 decodes the address signal and the command status signal, extracts the address, the data, and the number of bytes of the data indicated in the address signal, and the command indicated in the command status signal, generates data indicating this information in a predetermined format, and transmits the data to the internal RAM 112. The access log recording unit 101 also transmits an address signal indicating an address where the data is written to the internal RAM 112. An example of such a format consists of 64 bits in total where 24 bits are used for indicating an address, 32 bits are used for indicating the data, two bits are used for indicating the number of bytes, one bit is used for indicating the command, and five bits are used for other identifications. The access log recording unit 101 generates data in such a format. The data is then transmitted to the internal RAM 112, and written to the address specified in the address signal, so that the data is stored as the access log indicating the target location accessed by the CPU 100 and the content of such an access.

A time period for which the access log is stored is set to the time period from when the function of the WDT in the system controller 105 to be described later specifies a predetermined time period for which the CPU 100 is monitored and starts counting time elapsed until when the count is reset. Every time this time period elapses, the access log stored in the internal RAM 112 is overwritten by a new access log.

Figure 5:
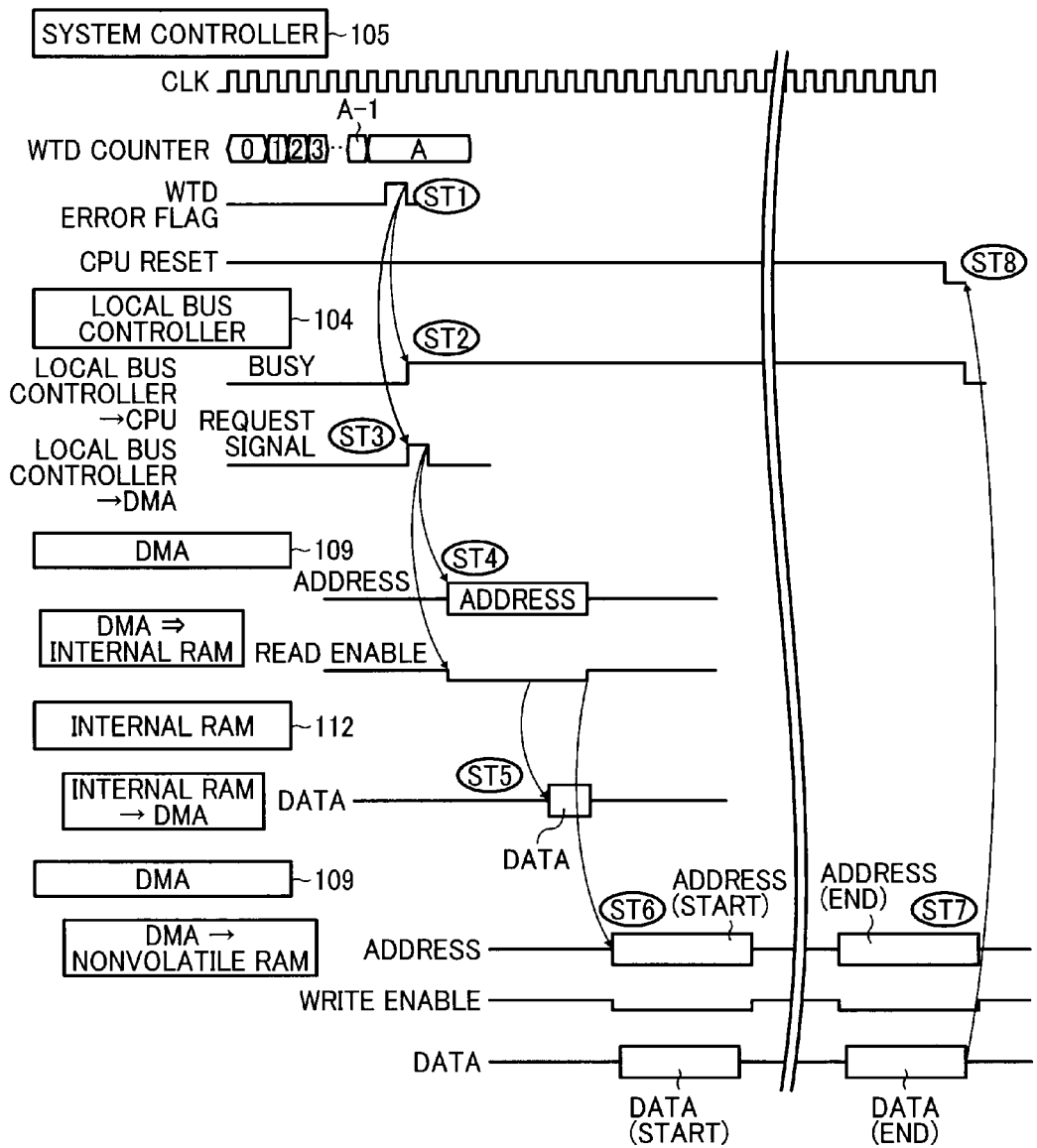
FIG. 5 is a schematic view illustrating an exemplary exchange of signals performed when the occurrence of an error in the CPU 100 is detected.

In the first embodiment, when any occurrence of an error in the CPU 100 is detected, the DMA 109 moves the access log stored in the internal RAM 112 to the nonvolatile RAM 208 without any mediation of the CPU 100. An exchange of signals performed in such a condition will now be explained with reference to FIG. 5. An error occurring in the CPU 100 includes an error of the CPU 100 itself. FIG. 5 indicates an exchange of signals performed from when the system controller 105 detects the occurrence of an error in the CPU 100 until when the CPU 100 is reset. Once the system controller 105 enables the function of the WDT by setting a predetermined time period for which the CPU 100 is monitored (for example, time period A) as an initial setting, the system controller 105 counts elapsed time in synchronization with a predetermined clock signal, and writes the count to the register (referred to as a counter register). Within a predetermined time period thus set, the CPU 100 performs a writing operation to the count of the counter register in the system controller 105 to reset the count. As a result, the count in the counter register in the system controller 105 is returned to "0", and the system controller 105 starts counting elapsed time in synchronization with the clock signal using the function of the WDT. If the CPU 100 does not make any response although a predetermined time has elapsed, in other words, if the count in the counter register in the system controller 105 is not reset by the CPU 100, the system controller 105 detects that an error has occurred in the CPU 100. The system controller 105 then generates an error signal, and transmits the error signal to the local bus controller 104 (ST1). Upon receiving the error signal, the local bus controller 104 transmits a busy signal to the CPU I/F 102 (ST2), and, at the same time, transmits a request signal to the DMA 109 in the local bus controller 104 to move the access log (ST3). The busy signal is kept transmitted until the busy signal is cancelled. During that time, the DMA 109 will not accept any other signal from the CPU I/F 102, and prioritizes storing the access log.

More specifically, the DMA 109 transmits an address signal indicating the address preset as an address for storing therein the access log in the internal RAM 112 and an enable signal requesting reading of data from the address to the internal RAM 112 without any mediation of the CPU 100 (ST4). Upon receiving the address signal and the enable signal, the internal RAM 112 transmits a data signal indicating the data stored as an access log in the address indicated by the address signal to the DMA 109 (ST5). Upon transmitting the data, the internal RAM 112 divides the data in a plurality of pieces, instead of sending the data stored as an access log in the address preset as the address for storing therein the access log all at once to the DMA 109. Upon receiving the data signal from the internal RAM 112, the DMA 109 transmits an address signal indicating an address to which the data is written in the nonvolatile RAM 208 connected to the local bus 201, a write enable signal requesting writing of data to the address, and a data signal (ST6). The DMA 109 then updates the address to which the data is written by incrementing the address by the amount of the data. When a new data signal is received from the internal RAM 112, the DMA 109 transmits an address signal indicating the address thus updated, a write enable signal, and a new data signal. The data is kept transmitted and moved from the internal RAM 112 to the nonvolatile RAM 208 via the DMA 109 until the transmission reaches the end of the address that is pre-set as an address for storing therein the access log in the internal RAM 112. When the data is completely moved from the DMA 109 to the nonvolatile RAM 208 (ST7), the system controller 105 transmits a reset signal to the CPU 100 (ST8). Upon receiving the reset signal, the CPU 100 is reset. The CPU 100 reads the controlling data from the ROM 207, controls the CPU bus 200 using the controlling data to cancel the reset status, and recovers.

In the manner described above, the CPU I/F 102 stores the access log in the internal RAM 112 via the access log recording unit 101 based on the address signal and the command status signal transmitted from the CPU 100 to the target location. Once the system controller 105 detects any occurrence of an error in the CPU 100, the DMA 109 moves the access log stored in the internal RAM 112 to the nonvolatile RAM 208 before resetting the CPU 100. In such a configuration, the access log for the time period from when the normal operation of the CPU 100 is confirmed to immediately after the occurrence of the error can be stored in the nonvolatile RAM 208, without any mediation of the CPU 100. In this manner, the access log is available for analysis. Therefore, the cause of the occurrence of an error can be identified more easily. Furthermore, such a configuration enables contents of accesses made to the modules and the devices to be analyzed, and contents of the entire sequential operations to be analyzed. Moreover, the internal RAM 112 does not require a large capacity. Therefore, production costs of the information processing apparatus 50 can be reduced, without increasing the size of the information processing apparatus 50.

Second Embodiment

A second embodiment of the information processing apparatus, the image forming apparatus, and the information processing program will now be explained. The portions that are the same as those in the first embodiment will be given the same reference numerals, and explanations thereof will be omitted hereunder.

Figure 6:
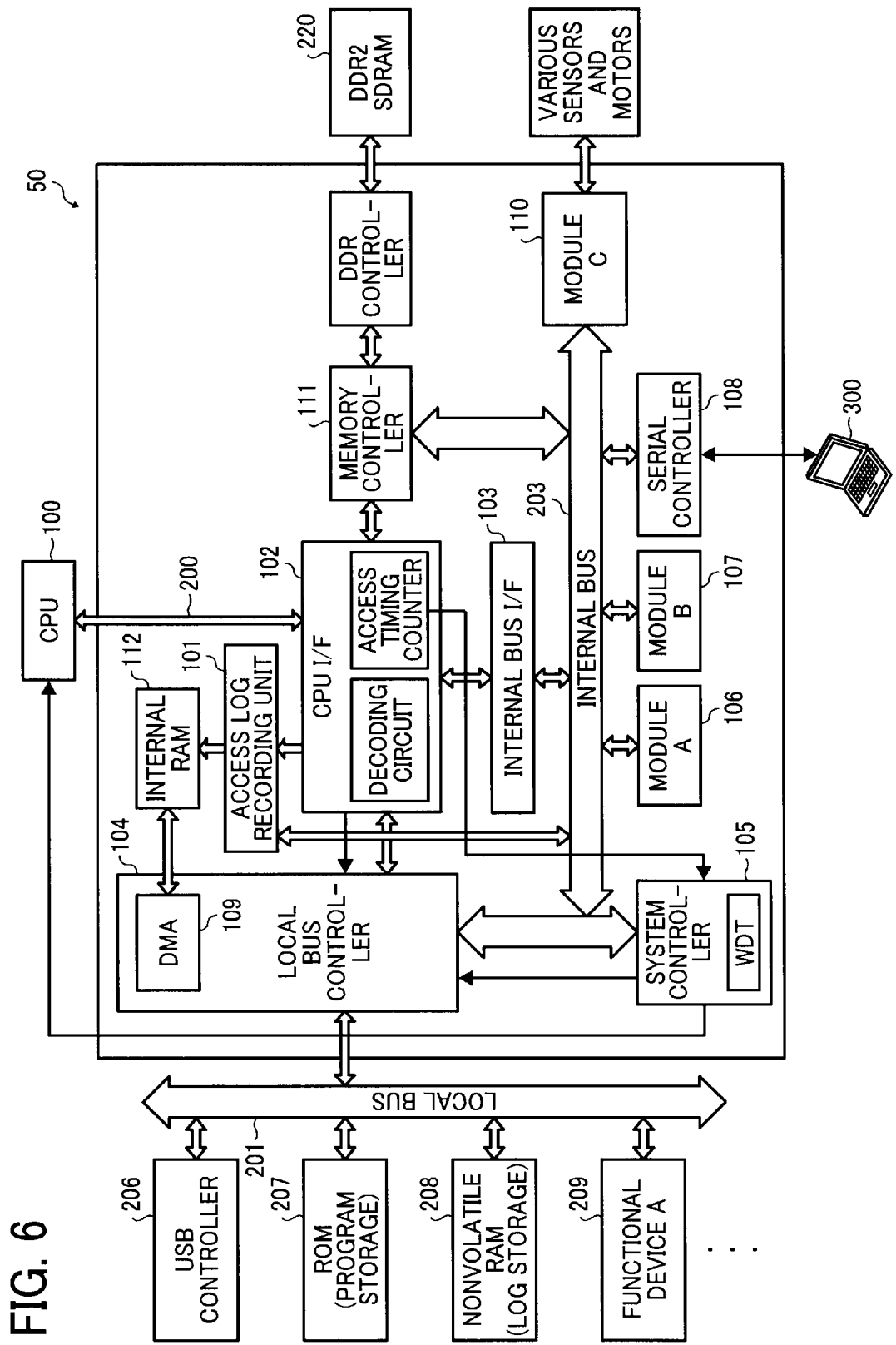
FIG. 6 is a schematic view illustrating an exemplary hardware configuration of the information processing apparatus 50 according to a second embodiment of the present invention.

In the first embodiment, any occurrence of an error in the CPU 100 is detected by the function of the WDT. However, in the second embodiment, occurrence of an error is detected by detecting the status of the CPU bus 200. FIG. 6 is a schematic view illustrating an exemplary hardware configuration of the information processing apparatus 50 according to the second embodiment. The configuration according to the second embodiment is different from that according to the first embodiment in that the CPU I/F 102 includes an access timing counter. The access timing counter counts time elapsed since the CPU bus 200 was asserted by the CPU 100 to transmit signals to the target location. If any response is not received from the CPU 100, in other words, the CPU bus 200 is not de-asserted by the CPU 100 although the time elapsed counted by the access timing counter exceeds a predetermined time, the CPU I/F 102 detects that an error has occurred in the communications between the CPU 100 and the CPU bus 200, and that an error has occurred in the CPU 100.

Figure 7:
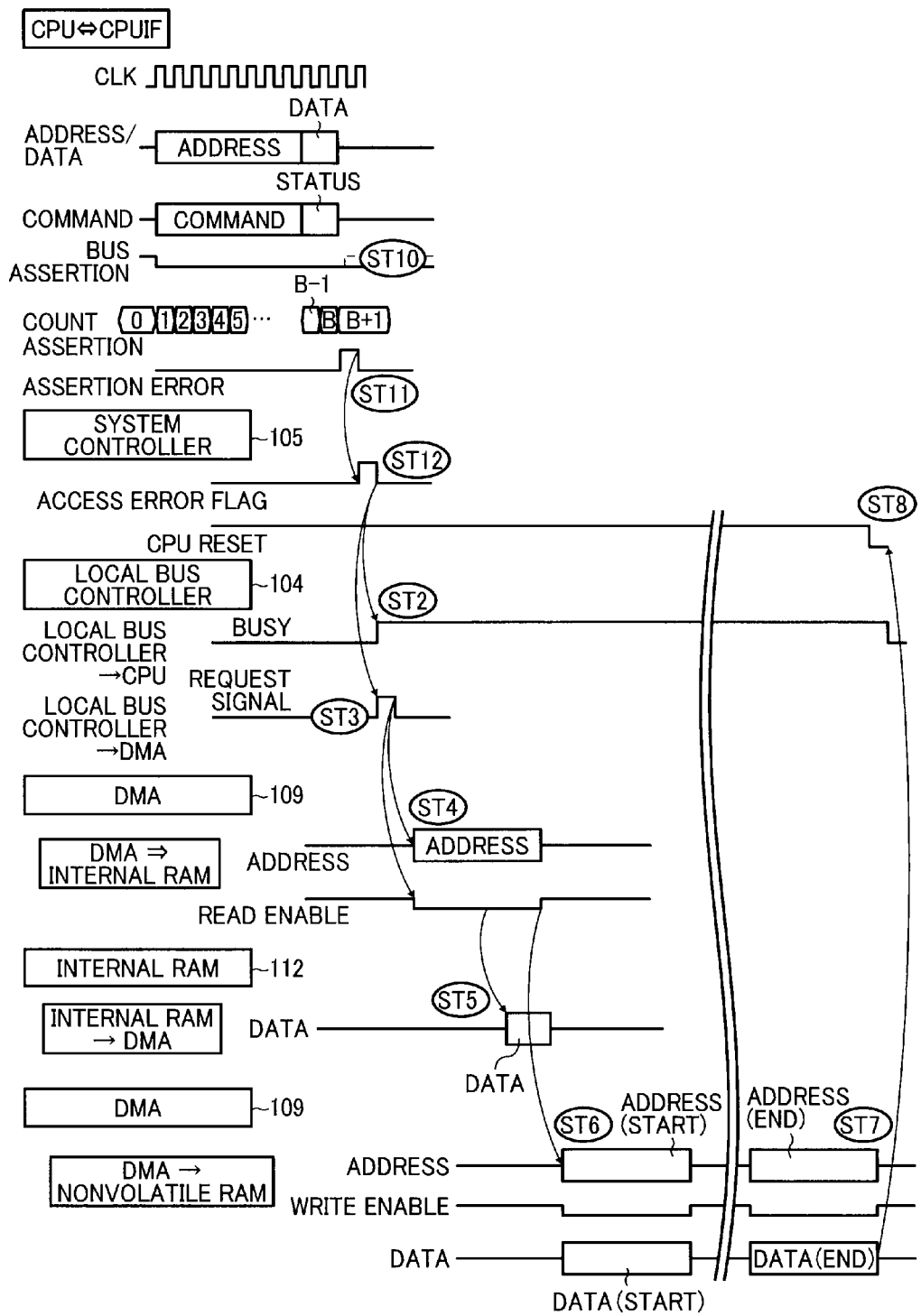
FIG. 7 a schematic view illustrating an exemplary exchange of signals performed from when the occurrence of an error in the CPU 100 is detected by the CPU I/F 102 until the CPU 100 is reset.

An exchange of signals performed from when the CPU I/F 102 detects any occurrence of an error in the CPU 100 until when the CPU 100 is reset in the second embodiment will now be explained with reference to FIG. 7. When the CPU bus 200 is not de-asserted by the CPU 100 although elapsed time counted by the access timing counter, counted from when the CPU bus 200 is asserted by the CPU 100 to transmit an address signal and a command status signal, exceeds a predetermine time (for example, time B), the system controller 105 detects that an error has occurred in the CPU 100 (ST10). The system controller 105 then generates an assertion error signal, and transmits the signal to the system controller 105 (ST11). Upon receiving the assertion error signal (ST12), the system controller 105 transmits a busy signal to the CPU I/F 102 (ST2), and a request signal for moving the access log to the DMA 109 in the local bus controller 104 (ST3), in the same manner as in the first embodiment. The steps at ST4 and thereafter are the same as those according to the first embodiment.

In the configuration described above, once any occurrence of an error in the CPU 100 is detected, the access log for the time period from when the normal operation of the CPU 100 is confirmed to immediately after the occurrence of the error can be stored in the nonvolatile RAM 208 without any mediation of the CPU 100 before resetting the CPU 100. In this manner, the access log is available for analysis.

Variations

These embodiments of the present invention are not limited to as they are, and can be realized by components thereof modified within the scope not deviating from the spirit of the present invention for practical use. Furthermore, different aspects of the present invention can be achieved by combining a plurality of components disclosed in the embodiments appropriately. For example, some of the components may be removed from the entire components disclosed in the embodiments. Furthermore, the components according to the different embodiments may be combined as appropriate. In addition, other possible different variations include those explained below using some examples.

In each of the embodiments, various computer programs executed on the information processing apparatus 50 may be provided in a manner stored in a computer connected to a network such as the Internet to be made available for downloads via the network. The computer programs may also be provided in a manner recorded in a computer-readable recording medium, such as a compact disk read-only memory (CD-ROM), a flexible disk (FD), a compact disk recordable (CD-R), and a digital versatile disk (DVD), as a file in an installable or an executable format.

In each of the embodiments, the information processing apparatus 50 may be an image forming apparatus including at least one of a copier function, a printer function, a scanner function, and a facsimile function. In such a configuration, the image forming apparatus includes an image forming unit that forms an image on a recording medium, such as paper, under the control of the CPU. The image forming unit is, for example, a copy unit that forms an image onto a recording medium using the image read from an original using a scanner, a printer engine such as a monochromatic plotter, a single-drum color plotter, and a four-drum color plotter, or a facsimile unit that forms an image on a recording medium using image data received via facsimile communication.

In each of the embodiments, conditions related to the storing operation of the access log may be made available for setting. An external pin related to the condition settings may be connected to the information processing apparatus 50, and the conditions may be set according to inputs made via the external pin, or condition settings may be performed by rewriting the value in a predetermined register in the information processing apparatus 50. Alternatively, the information processing apparatus 50 may include an operation input unit such as a keyboard or a mouse, and the condition settings may be performed based on inputs made via the operation input unit by a user or servicing personnel. Examples of conditions related to the storing operation of the access log include those described below.

For example, in each of the embodiments described above, when any occurrence of an error in the CPU 100 is detected, the access log stored in the internal RAM 112 is moved to the nonvolatile RAM 208. Alternatively, the access log may be kept stored in the internal RAM 112 without moving the access log. An option as to whether to move the access log to the nonvolatile RAM 208 may then be made selectable for setting. In such a configuration, a computer program providing a user interface for providing a setting as to whether to move the access log to the nonvolatile RAM 208 is stored in the ROM 207, for example, and the CPU 100 executes the computer program to provide the user interface. Based on an operation input performed via the operation input unit, a value in the register is rewritten to specify the setting. This is an example of a setting unit. When an error in the CPU 100 is detected, the DMA 109 refers to the value in the register, and if the setting in the value in the register specifies moving the access log to the nonvolatile RAM 208, the DMA 109 transmits the access log stored in the internal RAM 112 to the nonvolatile RAM 208.

Furthermore, in each of the embodiments, the time period for which the access log is stored in the internal RAM 112 is the time period from when the function of the WDT in the system controller 105 specifies a predetermined time period for which the CPU 100 is monitored and starts counting elapsed time to when the count is reset. Alternatively, such a time period may be configured in a variable manner. Such a variable period varies depending on the capacity of the internal RAM 112. For example, the time period from when the system controller 105 specifies a predetermined time period for which the CPU 100 is monitored to when another predetermined time period is newly specified may be set as one round, and the number of rounds may be specified correspondingly to the time period for which the access log is stored in the internal RAM 112. In such a configuration, a computer program providing a user interface for specifying the time period for which the access log is stored in the internal RAM 112 is stored in the ROM 207, for example, and the CPU 100 executes the computer program to provide the user interface. Based on an operation input performed via the operation input unit, a value in the register is rewritten to specify the setting. This is another example of the setting unit. The access log recording unit 101 refers to the value in the register, and stores the access log generated for the time period corresponding to the value specified therein in the internal RAM 112.

In each of the embodiments, the target locations for which the access log is stored in the internal RAM 112 may be limited. For example, the access log may be stored in the internal RAM 112 only when the module mediating with the target location is the local bus controller 104. Alternatively, the access log may be stored in the internal RAM 112 only when the target location is some of the modules connected to the internal bus I/F 103. In such a configuration, a computer program for limiting the target locations for which the access log is stored in the internal RAM 112 is stored in the ROM 207, for example, and the CPU 100 executes the computer program to provide the user interface. Based on an operation input performed via the operation input unit, such a setting is specified. When an error in the CPU 100 is detected, the DMA 109 transmits only the access log corresponding to the target locations preset by the CPU 100 to the nonvolatile RAM 208. In this manner, the modules or the devices that could be the cause of an error might be limited, for example. Therefore, such a configuration allows the contents of accesses made to such modules or devices to be mainly checked, to make analysis easier.

Moreover, the storage area in the internal RAM 112 for storing therein the access log may be set to a small size so as to reduce the overall capacity of the access log to be stored. In this manner, a predetermined time period for which the system controller 105 monitors the CPU 100 can be specified to a longer time.

Furthermore, in each of the embodiments, when an error occurs in the CPU 100, the access log stored in the internal RAM 112 is moved to the nonvolatile RAM 208 before resetting the CPU 100. Considering a case where another error occurs in the CPU 100 after the CPU 100 is reset and recovered, the access log stored in the internal RAM 112 is moved to the nonvolatile RAM 208 based on the occurrence of the error, and the previous access log moved to the nonvolatile RAM 208 is overwritten. To avoid such a situation, the access log stored in the nonvolatile RAM 208 may be configured not to be overwritten. In such a configuration, a computer program for specifying as to whether overwriting of the access log is permitted is stored in the ROM 207, for example, and the CPU 100 executes the computer program to provide the user interface. Based on an operation input performed via the operation input unit, a value in the register is rewritten to specify the setting. This is another example of the setting unit. When an error in the CPU 100 is detected, the DMA 109 refers to the value in the register, and if the setting in the value in the register indicates that overwriting of the access log is not permitted, the DMA 109 transmits the access log stored in the internal RAM 112 by specifying a different address from the one where the access log is already stored in the nonvolatile RAM 208. Such a configuration enables the access log moved to the nonvolatile RAM 208 to be obtained effectively.

Furthermore, in each of the embodiments, if there is a demand for obtaining the access log although no error has occurred in the CPU 100, the access log stored in the internal RAM 112 may be configured to be movable to the nonvolatile RAM 208 based on an input via an external pin or a setting in the register. In such a configuration, a computer program for moving the access log stored in the internal RAM 112 to the nonvolatile RAM 208 is stored in the ROM 207, for example, and the CPU 100 executes the computer program to provide the user interface. Based on an operation input performed via the operation input unit, the value of the register is rewritten to specify the setting. This is another example of the setting unit. The DMA 109 refers to the value in the register, and transmits the access log stored in the internal RAM 112 to the nonvolatile RAM 208 according to the value. Such a configuration enables a user or servicing personnel to obtain the access log at a desired timing.

In each of the embodiments, the CPU 100 is reset after the DMA 109 completes transmitting the access log stored in the internal RAM 112 to the nonvolatile RAM 208. However, the CPU 100 may be reset while the DMA 109 is transmitting the access log to the nonvolatile RAM 208. In such a configuration, the local bus controller 104 should arbitrate and control the operation of the CPU 100 being reset and the operation of the DMA 109 transmitting the access log stored in the internal RAM 112 to the nonvolatile RAM 208. After the CPU 100 is recovered, the local bus controller 104 coordinates acceptance of signals transmitted by the CPU 100.

In each of the embodiments, the access log stored in the internal RAM 112 is moved to the nonvolatile RAM 208. However, the present invention is not limited thereto. For example, the access log stored in the internal RAM 112 may be moved to a USB memory that is removably connected to the USB controller 206, instead of the nonvolatile RAM 208. Furthermore, the access log moved to the nonvolatile RAM 208 may be further moved to a USB memory. In such a configuration, when a USB memory is connected to the local bus 201 via the USB controller 206, for example, a set signal is transmitted to the local bus controller 104. Using this signal as a trigger, the local bus controller 104 may transmit and move the access log stored in the nonvolatile RAM 208 to the USB memory.

In such a configuration, the USB memory storing therein the access log may be removed from the information processing apparatus 50 and connected to another information processing apparatus, so that the access log stored in the USB memory can be analyzed on the information processing apparatus. For example, when a user is using the information processing apparatus 50 and it is difficult for a servicing personnel to analyze the access log on the information processing apparatus 50, the servicing personnel can obtain the access log via the USB memory, and analyze the access log on another information processing apparatus that is available to the servicing personnel.

In each of the embodiments, the information processing apparatus 50 is explained to function as a master, and the CPU 100 is explained to function as a slave. However, the configuration according to each of the embodiment can be also applied when the information processing apparatus 50 functions as a slave and the CPU 100 functions as a master.

According to the present invention, when an error occurs in the CPU, contents of accesses to the target locations made by the CPU during the period from when the normal operation of the CPU is confirmed to immediately after any occurrence of an error can be stored.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a mediating unit that
      accepts a signal transmitted from a central processing unit (CPU) to a target location, the target location being a module or device connected to the information processing apparatus via a mediating module,
      decodes the signal, and
      transmits the decoded signal to a log storing control unit and the mediating module mediating with the target location, the log storing control unit generating an access log indicating the target location and a content of an access made to the target location using the signal received from the mediating unit, and storing the access log in a first storage unit;
   a detecting unit that detects an occurrence of an error in the CPU; and
   a memory control unit that stores the access log stored in the first storage unit in a second storage unit in response to the occurrence of an error being detected,
   wherein
      the CPU and the mediating unit are connected via a bus, and
      the detecting unit detects occurrence of an error in the CPU when the bus is not de-asserted although a second predetermined time elapses since the bus is asserted to transmit the signal.

2. The information processing apparatus according to claim 1, wherein:
   the detecting unit detects an occurrence of an error in the CPU when the CPU does not respond after a first predetermined time period specified by a watchdog timer has elapsed.

3. The information processing apparatus according to claim 1, wherein the second storage unit is removably connected to the information processing apparatus.

4. The information processing apparatus according to claim 1, further comprising:
   a setting unit that sets conditions related to storing of the access log.

5. The information processing apparatus according to claim 4, wherein
   the setting unit specifies the target location for which the access log is stored in the second storage unit, and
   the memory control unit stores the access log stored in the first storage unit in the second storage unit for the target location specified by the setting unit.

6. The information processing apparatus according to claim 4, wherein
   the setting unit specifies a time period for which the access log is stored in the second storage unit, and
   the log storing control unit stores the access log generated for the time period specified by the setting unit in the first storage unit.

7. The information processing apparatus according to claim 6, wherein
   the setting unit specifies a number of rounds each of which is set from when a watchdog timer starts counting elapsed time to when a count is reset and the number of rounds is used correspondingly to the time period for which the access log is stored in the second storage unit, and
   the log storing control unit stores each access log generated in a time period corresponding to the number of rounds specified by the setting unit in the first storage unit.

8. An image forming apparatus comprising:
   the information processing apparatus of claim 1; and
   an image forming unit that forms an image on a recording medium under control of the CPU.

9. A non-transitory computer-readable medium storing computer-readable instructions thereon that when executed by a computer causes the computer to perform a method comprising:
   accepting a signal transmitted from a central processing unit (CPU) to a target location, the target location being a module or device connected to the information processing apparatus via a mediating module;
   decoding the signal;
   transmitting the decoded signal to a log storing control unit and the mediating module mediating with the target location, the log storing control unit generating an access log indicating the target location and a content of an access made to the target location using the signal received from the mediating module, and storing the access log in a first storage unit;

detecting an occurrence of an error in the CPU; and
storing the access log stored in the first storage unit in a second storage unit in response to the occurrence of an error being detected,
wherein
the CPU and the mediating module are connected via a bus, and
the detecting detects an occurrence of an error in the CPU when the bus is not de-asserted although a second predetermined time elapses since the bus is asserted to transmit the signal.

* * * * *